Patented June 23, 1925.

1,542,968

UNITED STATES PATENT OFFICE.

RICHARD O. SNELLENBERGER, OF CHICAGO, ILLINOIS, ASSIGNOR TO IRON OXIDE PRODUCTS, INC., OF CICERO, ILLINOIS, A CORPORATION OF ILLINOIS.

MANUFACTURE OF IRON OXIDE.

No Drawing. Application filed June 28, 1922. Serial No. 571,566.

*To all whom it may concern:*

Be it known that I, RICHARD O. SNELLENBERGER, a citizen of the United States, and a resident of Chicago, in the county of Cook and State of Illinois, have invented certain new and useful Improvements in the Manufacture of Iron Oxide, of which the following is a full, clear, and exact description.

The invention relates to the manufacture of iron oxide. The primary object of the invention is to provide a method for the artificial production of iron oxide, so that it may be made in large quantities and at a low cost.

The invention consists in the improvements hereinafter set forth and more particularly defined by claims at the conclusion hereof.

The invention is exemplified in the following practice: Cast iron, in the form of borings, filings, scrap or other waste is reduced in a suitable mill to a fineness of about 20 mesh. The comminuted iron is then spread over a suitable bed or floor in a pile about 24 inches deep. With each ton of comminuted iron is mixed approximately 20 pounds of granulated sulphate of iron or copperas and enough water is added to thoroughly moisten the material. A sand cutter, such as is used in preparing sand for moulding, is then operated through the pile to stir and aerate the iron and chemical. This treatment is repeated about ten times every 24 hours and about four times the material is moistened with water, about 80 pounds being used for each ton of material. During this treatment, the temperature of the material will rise to about 160° F. while it is in the pile. It will be permitted to remain at this temperature. The occasional aeration and moistening will retard its temperature and sufficient water will be added to reduce its temperature to 75° F. or 80° F. This treatment is continued for about seven days. At the end of this time, the temperature should be approximately 10° F. above normal. At this point, about 75% of the material will have a fineness of 100 mesh and the remainder about 40 mesh and is substantially pure. The product in a dry condition is then passed through an air separator by which the fine particles of approximately 150 mesh will be separated from the coarser particles. The fine powder separated constitutes an iron oxide powder which is substantially pure. The coarser particles are retreated with batches of comminuted iron and sulphate of iron or copperas as hereinbefore set forth.

The sulphate of iron or copperas accelerates the oxidation and the latter produces heat in the material. The sulphate of iron or copperas also serves to blend the product to the desired color. While the material is in the pile and while it is being agitated by the sand cutter, the material is exposed to the atmosphere to cause oxidation. The iron oxide thus manufactured can be produced much cheaper than natural oxide. It is now common practice to mix and cut wood shavings or crushed corn cobs with iron oxide and to use the product as a gas purifying reagent. The product of the present invention is an iron oxide which will absorb substantially its weight in hydrogen sulphide from gas, which is a much higher percentage than is collected from prior methods, and the gas thus produced is purer than has been possible with natural oxide. Since the manufactured oxide is approximately pure, it may be repeatedly used in purifying gas and may be revivified a number of times by merely exposing it to the air. While the product is of special utility as a purifying reagent for gas, it may also be used for other purposes where natural oxide has heretofore been used.

The proportions of the chemicals specified are approximate and may be varied to suit conditions without departing from the spirit and scope of the invention.

Having thus described the invention, what I claim as new and desire to secure by Letters Patent, is:

1. That improvement in the manufacture of iron oxide which consists in exposing to air comminuted iron treated with an oxidation-accelerating chemical reagent, agitating the material to expose it to the air, and periodically reducing its temperature, until oxidation has been substantially completed.

2. That improvement in the manufacture of iron oxide which consists in exposing to air comminuted iron treated with an oxidation-accelerating chemical reagent, periodically agitating said material to expose it to air, and periodically moistening said material to reduce its temperature, until oxidation has been substantially completed.

3. That improvement in the manufacture of iron oxide which consists in exposing to air comminuted iron treated with an oxidation-accelerating chemical reagent, and moistening said material when it reaches a temperature of approximately 160° F. to reduce its temperature, until the oxidation has been substantially completed.

Signed at Chicago, Illinois this 5th day of June, 1922.

RICHARD O. SNELLENBERGER.